United States Patent
Gaither et al.

(10) Patent No.: US 9,702,304 B1
(45) Date of Patent: Jul. 11, 2017

(54) AUTOMATIC ENGINE BRAKING AND INCREASED REGENERATIVE CAPACITY HYBRID VEHICLE

(71) Applicant: Toyota Motor Engineering & Manufacturing North America, Inc., Erlanger, KY (US)

(72) Inventors: Geoffrey D. Gaither, Torrance, CA (US); Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/084,964

(22) Filed: Mar. 30, 2016

(51) Int. Cl.
*F02D 13/04* (2006.01)
*F02D 11/10* (2006.01)
*B60L 7/26* (2006.01)
*B60T 17/22* (2006.01)
*B60T 7/04* (2006.01)
*F02D 9/02* (2006.01)
*F02D 41/12* (2006.01)

(52) U.S. Cl.
CPC .............. *F02D 11/107* (2013.01); *B60L 7/26* (2013.01); *B60T 7/042* (2013.01); *B60T 17/221* (2013.01); *F02D 9/02* (2013.01); *F02D 13/04* (2013.01); *F02D 41/12* (2013.01); *F02D 41/123* (2013.01); *F02D 2009/0235* (2013.01); *F02D 2011/103* (2013.01)

(58) Field of Classification Search
None
See application file for complete search history.

(56) References Cited

U.S. PATENT DOCUMENTS

| | | | |
|---|---|---|---|
| 4,637,277 A | 1/1987 | Gaddi | |
| 6,543,565 B1 | 4/2003 | Phillips et al. | |
| 6,779,506 B1* | 8/2004 | Beaucaire | F01L 13/06 123/321 |
| 6,874,360 B1 | 4/2005 | Kar et al. | |

(Continued)

FOREIGN PATENT DOCUMENTS

WO  WO 2015/025003  2/2015

*Primary Examiner* — Redhwan k Mawari
*Assistant Examiner* — Edward Torchinsky
(74) *Attorney, Agent, or Firm* — Snell & Wilmer LLP (57) ABSTRACT

A system for providing deceleration in a hybrid vehicle having a hydraulic braking system and a regenerative braking system. The system includes a hydraulic braking sensor configured to determine a status of the hydraulic braking system. The system also includes a brake pedal unit configured to determine brake pedal data. The system also includes a battery configured to store energy generated by the regenerative braking system. The system also includes a processor configured to determine whether the hydraulic braking system is compromised. The processor is also configured to detect an emergency braking situation based on the brake pedal data. The processor is also configured to increase engine speed of the engine to induce engine braking, and increase the maximum charge limit of the battery to increase a regenerative braking capacity of the regenerative braking system when the hydraulic braking system is compromised and the emergency braking situation is detected.

19 Claims, 4 Drawing Sheets

(56) References Cited

U.S. PATENT DOCUMENTS

| | | | |
|---|---|---|---|
| 6,934,610 B2 * | 8/2005 | Wakashiro | B60K 6/48 180/65.25 |
| 7,072,758 B2 | 7/2006 | Kolmanovsky et al. | |
| 7,908,067 B2 | 3/2011 | Soliman et al. | |
| 8,306,722 B2 | 11/2012 | Whitney et al. | |
| 8,744,677 B2 | 6/2014 | Shimasaki et al. | |
| 9,175,617 B2 | 11/2015 | Seavone et al. | |
| 2008/0059031 A1 | 3/2008 | Yasui | |
| 2010/0256849 A1 * | 10/2010 | Akimoto | B60K 6/445 701/22 |
| 2012/0116656 A1 | 5/2012 | Martin et al. | |
| 2013/0231812 A1 | 9/2013 | Tokumochi et al. | |
| 2014/0358400 A1 | 12/2014 | Whitney et al. | |
| 2015/0233470 A1 | 8/2015 | Seay et al. | |
| 2015/0298701 A1 | 10/2015 | Suzuki et al. | |

* cited by examiner

FIG. 5

AUTOMATIC ENGINE BRAKING AND INCREASED REGENERATIVE CAPACITY HYBRID VEHICLE

BACKGROUND

Field

The present invention relates to a method and a system for increasing braking power, and more particularly to a method and a system for automatically providing engine braking and increased regenerative braking capacity in emergency or sudden braking situations.

Description of the Related Art

The hybrid automobile was created as a way to increase the efficiency of traditional automobiles. The hybrid automobile uses both an engine and a motor to accelerate the automobile. To stop the hybrid automobile, the hybrid automobile uses both hydraulic brakes and regenerative brakes or braking. The regenerative brakes or braking allow the motor to generate energy instead of deplete energy, allowing for a partial recapture of energy expended by the motor in moving the hybrid automobile. Hydraulic brakes generally do not recapture energy.

What is needed is a system and a method for providing deceleration of a hybrid vehicle when the hydraulic brakes are compromised, worn out or do not work properly.

SUMMARY

What is described is a system for providing deceleration in a hybrid vehicle having a hydraulic braking system and a regenerative braking system. The system includes a hydraulic braking sensor configured to determine a status of the hydraulic braking system. The system also includes a brake pedal unit configured to determine brake pedal data. The system also includes a battery configured to store energy generated by the regenerative braking system. The system also includes a processor (can be an electronic control unit) configured to determine whether the hydraulic braking system is compromised, worn out or not working properly. The processor is also configured to detect an emergency braking situation based on the brake pedal data. The processor is also configured to increase engine speed of the engine to induce engine braking, and increase the maximum charge limit of the battery to increase a regenerative braking capacity of the regenerative braking system when the hydraulic braking system is compromised, worn out or not working properly and the emergency braking situation is detected.

Also described is a hybrid vehicle having a hydraulic braking system and a regenerative braking system. The hybrid vehicle includes a brake pedal unit configured to determine brake pedal data. The hybrid vehicle also includes a battery configured to store energy generated by the regenerative braking system up to a maximum charge limit of the battery. The hybrid vehicle also includes a processor connected to the brake pedal unit and an engine. The processor is configured to determine a braking urgency level based on the brake pedal data. The processor is also configured to increase engine speed of the engine based on the braking urgency level to induce engine braking. The processor is also configured to increase the maximum charge limit of the battery based on the braking urgency level to increase a regenerative braking capacity of the regenerative braking system, when the braking urgency level exceeds a threshold value.

Also described is a method for providing deceleration in a hybrid vehicle having a hydraulic braking system and a regenerative braking system. The method includes determining, by a hydraulic braking sensor, a status of the hydraulic braking system. The method also includes determining, by a brake pedal unit, brake pedal data. The method also includes determining, by a processor, whether the hydraulic braking system is compromised, worn out or not working properly based on the status of the hydraulic braking system. The method also includes detecting, by the processor, an emergency braking situation based on the brake pedal data. The method also includes increasing, by the processor, engine speed of the engine to induce engine braking when the hydraulic braking system is compromised, worn out or not working properly and the emergency braking situation is detected. The method also includes increasing, by the processor, a maximum charge limit of a battery to increase a regenerative braking capacity of the regenerative braking system when the hydraulic braking system is compromised, worn out or not working properly and the emergency braking situation is detected.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for providing automatic engine braking and increased battery charge limit in hybrid vehicles in emergency or sudden braking situations. An emergency or sudden braking situation may occur when a driver of the hybrid vehicle swiftly, quickly or hardly applies the brakes in response to an object in the road, such as another vehicle, a yellow or red traffic light, a pedestrian or fallen debris. The systems and methods provide several benefits and advantages, such as providing additional braking capacity to regenerative braking systems of hybrid vehicles. This is advantageous because there may be instances where the hybrid vehicle primarily uses the regenerative braking system to bring the hybrid vehicle to a stop, such as if the hydraulic braking system is compromised, disabled, impaired, worn out, not working properly or otherwise unavailable. The term compromised means that the system is partially or completely not working. In these situations, and particularly if the situation is an emergency stop (or panic or sudden stop) situation, providing any additional braking is valuable in safely slowing down the hybrid vehicle.

Electrical energy may be used to increase the engine speed quickly, resulting in high-RPM engine operation to increase pumping losses and increase engine friction, which can be used to assist in braking. Additionally, temporary expansion of a maximum charge limit of the battery can be provided to enhance braking capacity by the regenerative braking system. Automatically triggering engine braking and temporarily increasing maximum charge limit of the battery provide additional benefits of being internal mechanisms the hybrid vehicle can use to assist in braking and not requiring additional external braking mechanisms to be installed on the vehicle. Further, these systems and methods of supplementing braking do not require a physical modification to the vehicle.

An exemplary system includes a hydraulic braking sensor configured to determine a status of the hydraulic braking system. The system also includes a brake pedal unit configured to determine brake pedal data. The system also includes a battery configured to store energy generated by the regenerative braking system up to a maximum charge limit. The system also includes a processor (can be an electronic control unit) connected to the hydraulic braking sensor, the brake pedal unit, and an engine. The processor is configured to determine whether the hydraulic braking system is compromised based on the status of the hydraulic braking system. The processor is also configured to detect an emergency braking situation based on the brake pedal data. The processor is also configured to increase engine speed of the engine to induce engine braking, and temporarily increase the maximum charge limit of the battery to increase a regenerative braking capacity of the regenerative braking system when the hydraulic braking system is compromised, worn out or not working properly and the emergency braking situation is detected.

Figure 1:
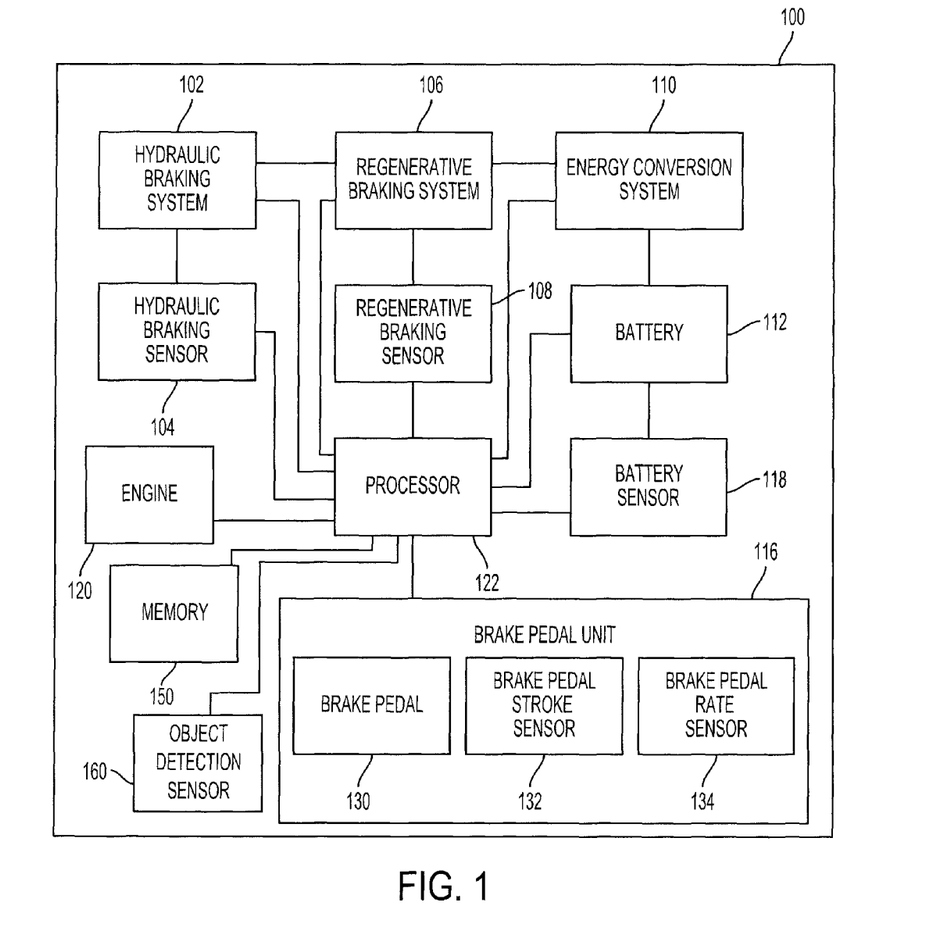
FIG. 1 is a block diagram of a system for providing automatic engine braking and increased battery charge limit in emergency braking situations, according to an embodiment of the invention.

In FIG. 1, the system is a vehicle 100, but the system can be, for example, an automobile, an automated transportation device, an electronic device that is coupled or connected to a vehicle or any other type of device which moves and utilizes braking. The vehicle 100 includes, for example, a hydraulic braking system 102, a hydraulic braking sensor 104, a regenerative braking system 106, a regenerative braking sensor 108, an energy conversion system 110, a battery 112, a brake pedal unit 116, a battery sensor 118 and an engine 120.

The hydraulic braking system 102 is connected to the hydraulic braking sensor 104, the regenerative braking system 106 and the processor 122. The hydraulic braking system 102 can include one or more friction brakes. For example, if the vehicle 100 has four wheels, the hydraulic braking system 102 can include four sets of brake calipers and brake disks causing the wheels of the vehicle 100 to stop by generating friction when the calipers are applied to the disks. Each of the brakes within the hydraulic braking system 102 can be activated individually or simultaneously with one or more of the brakes in the hydraulic braking system 102. The hydraulic braking system 102 can be activated when there is an indication that the vehicle 100 should be slowed down. Such an indication can be through the processor 122 and/or other devices to indicate that the vehicle 100 should be slowed down. The hydraulic braking system 102 can also be used alone or in conjunction with the regenerative braking system 106 to slow the vehicle 100.

The hydraulic braking sensor 104 is connected to the hydraulic braking system 102 and the processor 122. The hydraulic braking sensor 104 can generate hydraulic brake data regarding the operation of the hydraulic braking system 102. The hydraulic brake data may be collectively for the hydraulic braking system 102 or for each of the brakes within the hydraulic braking system 102. For example, the hydraulic braking sensor 104 can detect the temperature, whether each of the brakes is active or inactive, a length of time each brake is active or inactive, a supplied braking force, and a status of whether the hydraulic braking system 102 is operating or whether the hydraulic braking system 102 is impaired or compromised, either fully or partially. In some embodiments, the hydraulic braking system 102 and the hydraulic braking sensor 104 are a part of a single unit within the vehicle 100.

The regenerative braking system 106 is connected to the hydraulic braking system 102, the regenerative braking sensor 108, the energy conversion system 110 and the processor 122. The regenerative braking system 106 can include one or more regenerative brakes. For example, if the vehicle 100 has four wheels, the regenerative braking system 106 can have two regenerative brakes or four regenerative brakes. The regenerative brakes can be positioned at any suitable location in the vehicle 100, for example, in the front wheels of the vehicle 100, the rear wheels of the vehicle 100 or on both the front and the rear wheels of the vehicle 100. The regenerative braking system 106 can be used alone or with the hydraulic braking system 102 to slow the vehicle 100.

The regenerative brakes can be any type of brakes which regenerates energy while braking by recapturing some of the energy lost while braking. To regenerate the energy, the regenerative braking system 106 works with the energy conversion system 110.

The regenerative braking sensor 108 is connected to the regenerative braking system 106 and the processor 122. The regenerative braking sensor 108 can generate regenerative braking data regarding the operation of the regenerative braking system 106. The regenerative braking data can be collectively for the regenerative braking system 106 or for each of the brakes within the regenerative braking system 106. For example, the regenerative braking sensor 108 can detect the temperature, whether each of the regenerative brakes are active or inactive, a length of time each regenerative brake is active or inactive, a supplied braking force and a status of whether the regenerative braking system 106 is operating or whether the regenerative braking system 106 is impaired or compromised, either fully or partially.

The energy conversion system 110 is connected to the regenerative braking system 106, the battery 112 and the processor 122. The energy conversion system 110 generates energy when the regenerative braking system 106 is activated. For example, when the regenerative braking system 106 is activated to slow the vehicle 100, the energy conversion system 110 generates energy. In some embodiments, the energy conversion system 110 is a motor, such as an electric motor in a hybrid vehicle. The motor can operate in a first direction when moving the vehicle 100. The motor can operate in a second direction when generating energy using the regenerative braking system 106. In some embodiments, the regenerative braking system 106, the regenerative braking sensor 108 and the energy conversion system 110 are part of a single unit within the vehicle 100.

The battery 112 is connected to the energy conversion system 110, the battery sensor 118 and the processor 122. The battery 112 receives and stores the energy generated by the energy conversion system 110. The battery 112 can also provide energy to the energy conversion system 110. For example, if the energy conversion system 110 is a motor, then the battery 112 can power the motor. The battery 112 can also power the energy conversion system 110 to cause the engine 120 to turn or operate. The energy conversion system 110 can also provide power to any other electronic device in the vehicle 100.

The battery sensor 118 is connected to the battery 112 and the processor 122. The battery sensor 118 detects battery data. The battery data indicates information associated with the battery 112, such as a state of charge of the battery 112, the maximum capacity of the battery 112, a percent utilization of the battery 112, a recharge rate of the battery 112 and a depletion rate of the battery 112.

The processor 122 can be a microprocessor or an electronic control unit specifically configured to operate and perform functions for and related to the operations of the vehicle 100 or the operations of components or parts of the vehicle 100. The processor 122 may establish a maximum charge limit of the battery 112 that is, in most situations, less than the maximum battery capacity, to reduce wear and increase life of the battery 112 resulting from overcharging. The processor 122 also establishes a charge accepting rate limit to reduce wear and increase life of the battery 112. The processor 122 periodically receives a state of charge of the battery 112 from the battery sensor 118. The processor 122 may also periodically receive a charge rate of the battery 112. When the state of charge of the battery 112 reaches the maximum charge limit or when the charge rate of the battery 112 reaches the charge accepting rate limit, the processor 122 communicates an indication to the engine 120 to use the stored energy until the state of charge of the battery 112 falls below a lower state of charge threshold and/or until the charge rate of the battery 112 reaches a lower charge rate threshold. In some embodiments, the engine 120 uses the stored energy by increasing engine speed to a high-RPM rate (e.g., greater than 3,000 RPMs). When the state of charge falls below the lower state of charge threshold and/or the charge rate of the battery 112 falls below the lower charge rate threshold, the processor 122 communicates, to the engine 120, an indication to cease use of the stored energy of the battery 112.

In some embodiments, in addition to using the stored energy of the battery 112, the processor 122 deactivates use of the regenerative braking system 106 so that additional energy is not generated. In some embodiments, the processor 122 deactivates use of the regenerative braking system 106 by communicating an indication to the regenerative braking system 106 to deactivate use. In some embodiments, the processor 122 deactivates use of the regenerative braking system 106 by communicating an indication to the energy conversion system 110 to operate in a manner that does not generate energy.

The brake pedal unit 116 is connected to the processor 122 and includes a brake pedal 130, a brake pedal stroke sensor 132 configured to detect an amount the brake pedal has been engaged and a brake pedal rate sensor 134 configured to detect a rate at which the brake pedal has been engaged. The brake pedal unit 116 provides data to the processor 122 associated with brake input by the driver and the processor 122 facilitates braking of the vehicle 100 by working in conjunction with the hydraulic braking system 102, the regenerative braking system 106 and the engine 120.

The vehicle 100 may be an autonomously driven vehicle and braking can be controlled by an autonomous driving system. In some embodiments, the processor 122 is responsible for controlling braking as part of the autonomous driving system. When braking is controlled by the autonomous driving system, a signal to apply brakes is determined electronically (e.g., by the processor 122) instead of by an indication from the brake pedal unit 116.

The engine 120 is connected to the processor 122 and is used alone or in conjunction with the energy conversion system 110 to move the vehicle 100. The engine 120 can be an internal combustion engine, a hybrid engine, a natural fuel engine, an ethanol engine, or any other type of engine that can move the vehicle 100.

In addition to the braking provided by the hydraulic braking system 102 and the regenerative braking system 106, the engine 120 may provide engine braking. Engine braking occurs naturally when the acceleration pedal goes from a depressed state to a released state. When the acceleration pedal is released, the throttle of the engine is closed. When the throttle is closed, a partial vacuum is formed, as air flow into the intake manifold is restricted, and a braking effect is achieved. Engine braking may be induced by increasing engine speed without combusting fuel, increasing pumping losses, engine friction and engine torque. In some embodiments, the engine speed is increased by the battery 112 via the energy conversion system 110.

The processor 122 is connected to the hydraulic braking system 102, the hydraulic braking sensor 104, the regenerative braking system 106, the regenerative braking sensor 108, the energy conversion system 110, the battery 112, the brake pedal unit 116, the battery sensor 118 and/or the engine 120. The processor 122 can activate and/or deactivate the hydraulic braking system 102 and/or the regenerative braking system 106. The processor 122 can also receive the hydraulic brake data and/or the regenerative brake data from the respective sensors.

The processor 122 is configured to detect emergency or sudden braking situations. In some embodiments, the processor 122 detects emergency braking situations based on data from the brake pedal stroke sensor 132 and the brake pedal rate sensor 134. For example, the processor 122 may detect an emergency braking situation when the brake pedal 130 is engaged fully and quickly. The processor 122 may detect the brake pedal 130 was fully engaged based on brake pedal stroke data from the brake pedal stroke sensor 132 and that the brake pedal 130 was quickly engaged based on brake pedal rate data from the brake pedal rate sensor 134. The processor 122 is also connected to a memory 150. The memory 150 is configured to store data such as emergency braking situation threshold data, which the processor 122 uses to detect emergency or sudden braking situations. The emergency braking situation threshold data may contain various criteria by which an emergency or sudden braking situation may be detected.

The processor 122 may also detect an emergency or sudden braking situation based on proximity to an object. In some embodiments, the processor 122 detects the emergency braking situation based on spatial data detected by an object detection sensor 160. In some embodiments, the object detection sensor 160 is a radar sensor located in a front portion of the vehicle 100 configured to detect a location or a distance to an object in front of the vehicle 100. The processor 122 receives the spatial data from the object detection sensor 160 and may determine an emergency or sudden braking situation based on the spatial data and a velocity of the vehicle 100. For example, when the spatial data indicates an object 300 feet away from the vehicle 100 and the vehicle 100 is travelling at 60 miles per hour, the processor 122 may determine an emergency or sudden braking situation.

In response to detecting the emergency or sudden braking situation, the processor 122 may communicate an indication to the engine 120 to increase engine speed to achieve high-RPM (e.g., greater than 4,000 RPMs) engine operation, thereby inducing engine braking. High-RPM engine operation without fuel combustion results in the throttle of the engine being closed and increases pumping losses and increases engine friction, which can be applied to assist in braking.

In addition, the vehicle 100 may temporarily increase the maximum charge limit and/or charge accepting rate of the battery 112 so that the regenerative braking system 106 may be used despite reaching a previously restricted threshold level of charge. In some embodiments, the processor 122 induces engine braking and temporarily increases the maximum charge limit and/or charge accepting rate of the battery 112 in an emergency or sudden braking situation where the hydraulic braking system 102 is compromised, worn out or not working properly. In some embodiments, the processor 122 induces engine braking and temporarily increases the maximum charge limit and/or charge accepting rate of the battery 112 in an emergency or sudden braking situation even when the hydraulic braking system 102 is fully functional, to assist the hydraulic braking system 102 in bringing the vehicle 100 to a stop (or slow down) as quickly as possible. In some embodiments, the maximum charge limit is returned to a previous maximum charge limit when the vehicle 100 comes to a complete stop. In some embodiments, the maximum charge limit is returned to a previous maximum charge limit when a predetermined amount of time has passed.

The processor 122 may be configured to determine a braking frequency. The braking frequency may be a measure of how often the driver of the vehicle 100 engages the brake pedal 130 during a trip or a predetermined period of time (e.g., 30 seconds, one minute or two minutes). In some embodiments, the processor 122 determines the braking frequency based on brake pedal data, such as brake pedal stroke data, over time. For example, the processor 122 may determine a high braking frequency when the brake pedal 130 has been engaged 10 times in a span of one minute, based on the brake pedal stroke data received from the brake pedal stroke sensor 132. The driver may engage the brake pedal 130 at a high frequency when the vehicle 100 is travelling down a long, steep hill or when the vehicle 100 is in congested traffic, for example.

When the processor 122 determines a braking frequency exceeding a braking frequency threshold, the processor 122 may increase engine speed to induce engine braking. The processor 122 may also increase maximum charge limit of the battery 112 to increase regenerative braking capacity of the regenerative braking system. In some embodiments, by increasing the engine speed and by increasing the maximum charge limit of the battery 112, the vehicle 100 is slowed automatically, in anticipation of a need for continued braking. In some embodiments, the increase in the engine speed and the increase in the maximum charge limit of the battery 112 in a high braking frequency situation is lower than the respective increases in the engine speed and the maximum charge limit in an emergency or sudden braking situation where the hydraulic braking system is compromised, worn out or not working properly.

In some embodiments, the processor 122 continuously determines braking frequency, and when the braking frequency falls below the braking frequency threshold, the engine speed and the maximum charge limit of the battery 112 are returned to previous levels.

Figure 2:
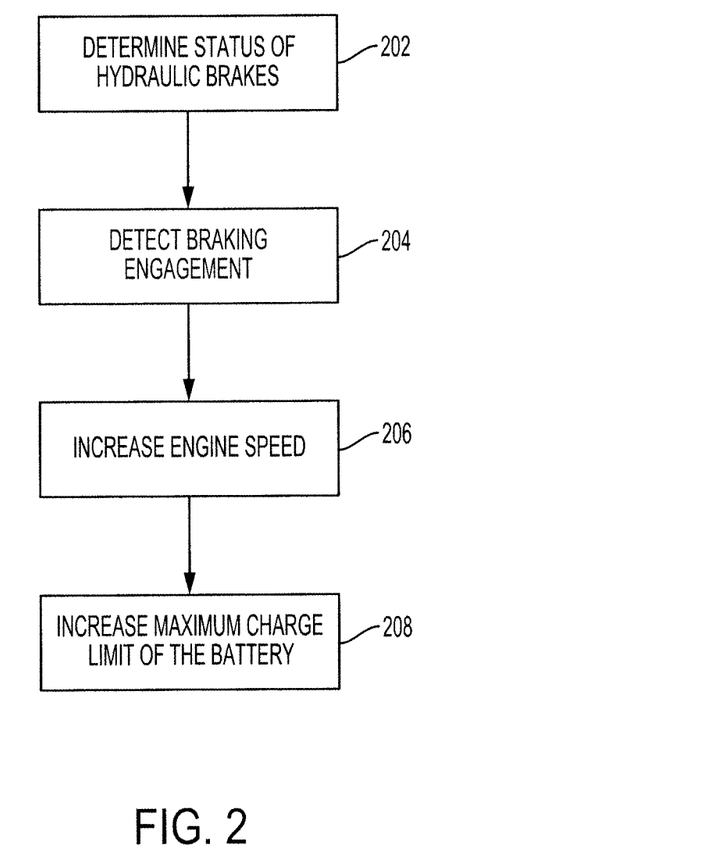
FIG. 2 is a flow chart of a process for providing automatic engine braking and increased battery charge limit in emergency braking situations, according to an embodiment of the invention.

FIG. 2 illustrates a flowchart of a method for providing additional deceleration in a hybrid vehicle, according to an embodiment of the present invention. The hybrid vehicle has a hydraulic braking system 102 and a regenerative braking system 106, each as described herein.

A status of the hydraulic braking system 102 is determined (step 202). The status of the hydraulic braking system 102 may be determined by the hydraulic braking sensor 104. The hydraulic braking system 102 may be partially or completely compromised. In some embodiments, when the hydraulic braking sensor 104 detects a loss of pressure within the hydraulic chamber or a failure of a sensor within the hydraulic braking system 102, the hydraulic braking sensor 104 communicates a status of impairment of the hydraulic braking system 102 to the processor 122. In some embodiments, the status of impairment of the hydraulic braking system 102 is a partial impairment, and the hydraulic braking system 102 is still able to provide some reduced braking power. In some embodiments, the status of impairment of the hydraulic braking system 102 is a complete impairment, and the hydraulic braking system 102 is unable to provide any braking power. In some embodiments, any impairment or compromise of the hydraulic braking system 102 triggers a fail-safe mode of the hydraulic braking system 102, which may be communicated to the processor 122.

Braking engagement is detected (step 204). In some embodiments, the brake pedal unit 116 detects the braking engagement using the brake pedal 130, the brake pedal stroke sensor 132 and the brake pedal rate sensor 134. The brake pedal unit 116 communicates the detected braking engagement to the processor 122. In some embodiments, the processor 122 determines the braking engagement based on brake pedal data received from the brake pedal unit 116. The brake pedal data may include brake pedal stroke data detected by the brake pedal stroke sensor 132 and the brake pedal rate data detected by the brake pedal rate sensor 134. In some embodiments, when the vehicle 100 is an autonomously driven vehicle, the braking engagement is determined by an autonomous driving system.

Additionally, the processor 122 may detect an emergency braking situation. In some embodiments, the detecting of an emergency braking situation is based on the brake pedal data. In some embodiments, when the brake pedal stroke and the brake pedal rate both exceed respective threshold values stored in the memory 150, the processor 122 detects an emergency braking situation. For example, when the brake pedal stroke data indicates that the brake pedal 130 is fully engaged and when the brake pedal rate data indicates a swift engagement of the brakes, the processor 122 detects an emergency braking situation. In some embodiments, the swift engagement of the brake pedal is when the brake pedal goes from an unengaged state to a fully engaged state in one quarter second or less. In some embodiments, the detecting of the emergency braking situation is based on the spatial data detected by the object detection sensor 160, as described herein.

In some embodiments, the processor 122 determines a braking urgency level based on the brake pedal data. A low braking urgency level may correspond to a situation where the vehicle 100 is slowed down slightly while traveling at high speeds. A high braking urgency level may correspond to an emergency braking situation. The braking urgency level criteria may be stored in the memory 150 and used by the processor 122 to determine a braking urgency level for a given brake pedal data. In some embodiments, the braking urgency level is determined by the autonomous driving system. The processor 122 determines the braking urgency level as part of the autonomous driving system, based on a combination of vehicle velocity, vehicle acceleration and spatial data from the object detection sensor 160. The processor 122 may increase the engine speed and increase the maximum charge limit of the battery 112 based on the braking urgency level. By providing additional braking power based on braking urgency level, the system is able to assist braking of the vehicle 100 even in situations that do not qualify as an emergency braking situation.

When the processor 122 detects an emergency braking situation and the hydraulic braking system 102 is compromised, the engine speed is increased (step 206). The processor 122 communicates an indication to the engine 120 to increase the engine speed. In some embodiments, increasing engine speed involves increasing engine RPM to 3,000 RPMs or greater. In some embodiments, when the processor 122 instructs the engine 120 to increase the engine speed, fuel is not provided to the engine 120. The engine 120 turns using energy provided by the battery 112 through the energy conversion system 110. The turning of the engine 120 without combustion of fuel increases engine friction and engine torque, creating a braking effect that is translated through the hybrid system, to the wheels of the vehicle 100.

In addition, when the processor 122 detects an emergency braking situation and the hydraulic braking system 102 is compromised, the maximum charge limit of the battery 112 is temporarily increased (step 208). Increasing the maximum charge limit of the battery 112 results in greater regenerative braking capacity, as the regenerative braking system 106 remains in an active state despite reaching a state of charge that previously triggered deactivation of the regenerative braking system 106. In some embodiments, the increasing of the engine speed in step 206 mitigates the increased charge generated and accepted by the battery 112, as stored energy in the battery 112 is used to increase the engine speed. In some embodiments, the charge accepting rate limit is also increased.

Though FIG. 2 illustrates step 206 before step 208, in some embodiments, step 208 may occur before step 206. In other embodiments, steps 206 and 208 may occur simultaneously.

Figure 3:
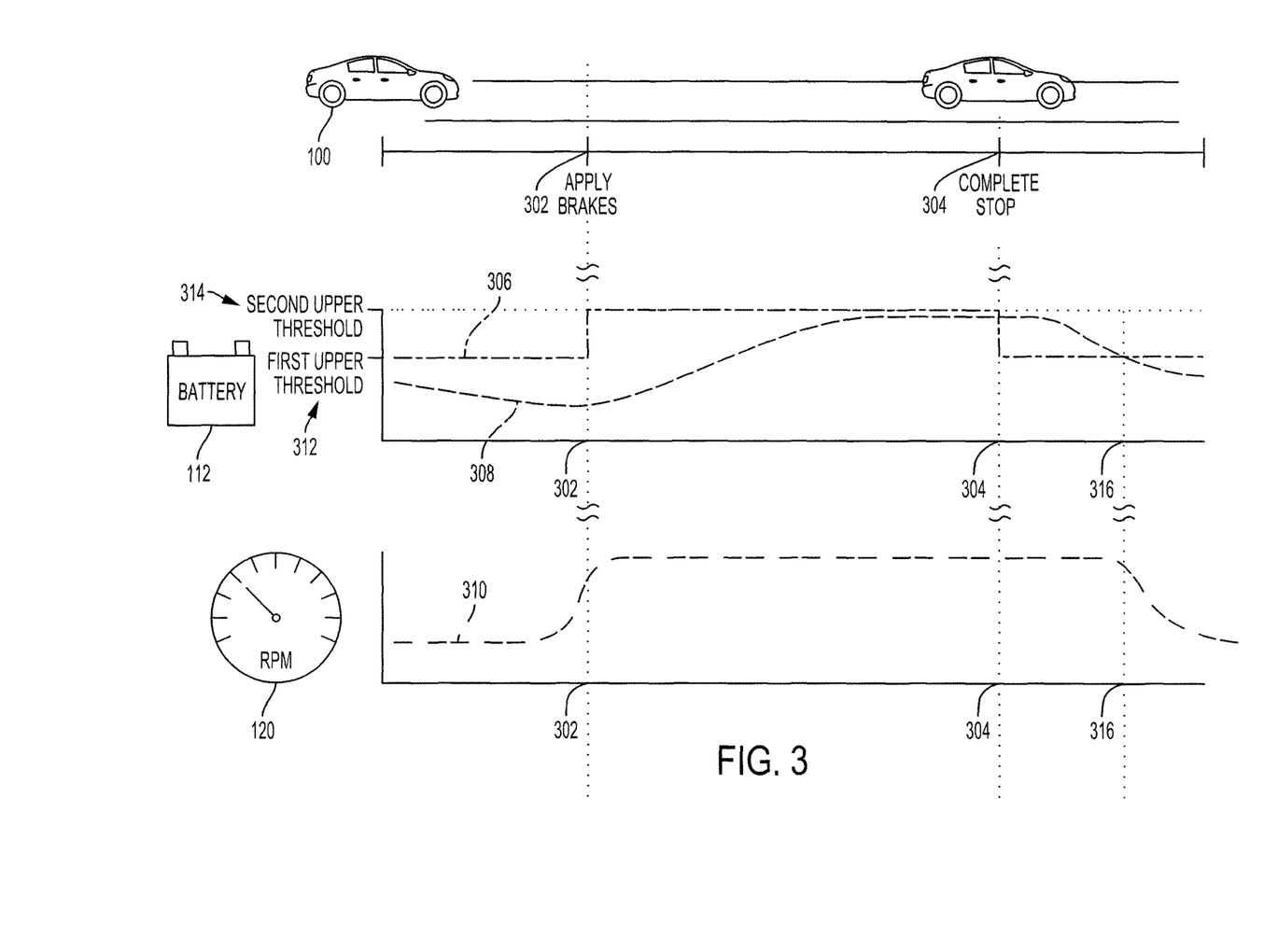
FIG. 3 is a diagram depicting a process of a system for providing automatic engine braking and increased battery charge limit in emergency braking situations, according to an embodiment of the invention.

FIG. 3 shows a diagram of a battery state and an engine state at different times in an example embodiment of the system. FIG. 3 includes a vehicle 100, in this case, a hybrid vehicle, a battery 112 and an engine 120, represented by an RPM gauge. The battery 112 and the engine 120 are each associated with respective graphs displaying respective statuses corresponding to various time periods.

With respect to the hybrid vehicle 100, before time 302 when brakes are applied, the hybrid vehicle 100 is traveling. The hydraulic braking system 102 of the hybrid vehicle 100 may be compromised. At the time 302, a driver of the hybrid vehicle 100 applies brakes in a sufficient manner to indicate an emergency braking situation, as described herein. The hybrid vehicle 100 comes to a stop at time 304.

With respect to the battery 112, before time 302, the maximum charge limit 306 of the battery 112 is at a first upper threshold 312. In addition, the state of charge 308 of the battery 112 is decreasing, as the hybrid vehicle 100 may be using the battery 112 to power certain functions of the hybrid vehicle or to accelerate the hybrid vehicle 100. At time 302, once the emergency braking situation has been detected, the maximum charge limit 306 of the battery 112 increases to a second upper threshold 314 higher than the first upper threshold 312, thereby increasing regenerative braking capacity. In some embodiments, the second upper threshold 314 is a maximum charge capacity of the battery 112. In addition, beginning at time 302, the state of charge 308 of the battery 112 increases, as the regenerative braking system 106 is engaged and providing energy to the battery 112 via the energy conversion system 110. Eventually, the state of charge 308 of the battery 112 reaches the second upper threshold 314. At time 304, when the hybrid vehicle 100 is at a complete stop, the maximum charge limit 306 of the battery 112 returns to the first upper threshold 312. In addition, the state of charge 308 of the battery 112, beginning at time 304, begins to decrease, and eventually falls below the first upper threshold 312 at time 316. In some embodiments, a charge accepting rate limit of the battery 112 in this situation follows a curve similar to the maximum charge limit 306.

With respect to the engine 120, before time 302, the engine RPM 310 may maintain a generally steady value, subject to fluctuations based on acceleration of the hybrid vehicle 100. At time 302, once the emergency braking situation is detected, fuel is no longer supplied to the engine 120 and the engine RPM 310 increases to induce engine braking, as described herein. In addition, the engine RPM 310 increase consumes some of the energy generated by the regenerative braking system 106, causing the state of charge 308 of the battery 112 to rise at a gradual rate instead of experiencing a sharp increase. Once at time 304, when the hybrid vehicle 100 is at a complete stop, the engine RPM 310 continues to maintain a high level in order to consume the energy of the battery 112 to bring the state of charge 308 below the first upper threshold 312. Once the state of charge 308 of the battery 112 falls below the maximum charge limit 306 of the battery 112 at time 316, the engine RPM gradually lowers.

Figure 4:
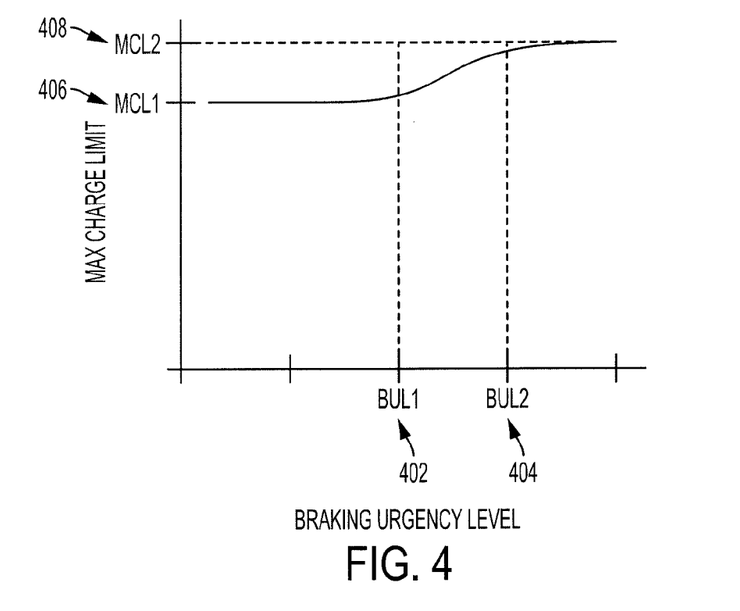
FIG. 4 is a graph depicting braking urgency level versus maximum battery charge limit, according to an embodiment of the invention.

FIG. 4 shows a graph of the maximum charge limit of the battery 112 versus a braking urgency level. As described herein, the processor 122 determines a braking urgency level. In some embodiments, the braking urgency level is based on a combination of the brake pedal stroke sensor data from the brake pedal stroke sensor 132 and the brake pedal rate sensor data from the brake pedal rate sensor 134. In some embodiments, the braking urgency level is based on the brake pedal rate sensor data alone.

As shown in FIG. 4, when the braking urgency level is below a first value BUL1 (402), the maximum charge limit remains constant at a value MCL1 (406). In some embodiments, the maximum charge limit is not increased unless the braking urgency level reaches a particular value.

As the braking urgency level increases after BUL1 (402), the maximum charge limit also increases, increasing regenerative braking capacity, until the braking urgency level reaches a second value BUL2 (404). Once the braking urgency level reaches BUL2 (404), the maximum charge limit has reached MCL2 (408) the maximum capacity of the battery 112. In some embodiments, BUL2 (404) corresponds with an emergency braking situation, as described herein. Braking urgency level may be on a scale of 0 to 100, and in an example embodiment, MCL1 is 80% charged, MCL2 is 100% charged, BUL1 is 50 (on the braking urgency level scale of 0 to 100) and BUL2 is 75 (on the braking urgency level scale of 0 to 100).

In some embodiments, the increase from a first maximum charge limit to a second maximum charge limit is discrete, as shown in FIG. 3. In other embodiments, the increase from a first maximum charge limit MCL1 (406) to a second maximum charge limit MCL2 (408) is continuous, as shown in FIG. 4. By providing a continuous transition, the benefit of increased braking power from the regenerative braking system 106 is realized even though an emergency braking situation is not experienced (e.g., braking situations between BUL1 (402) and BUL2 (404)).

Figure 5:
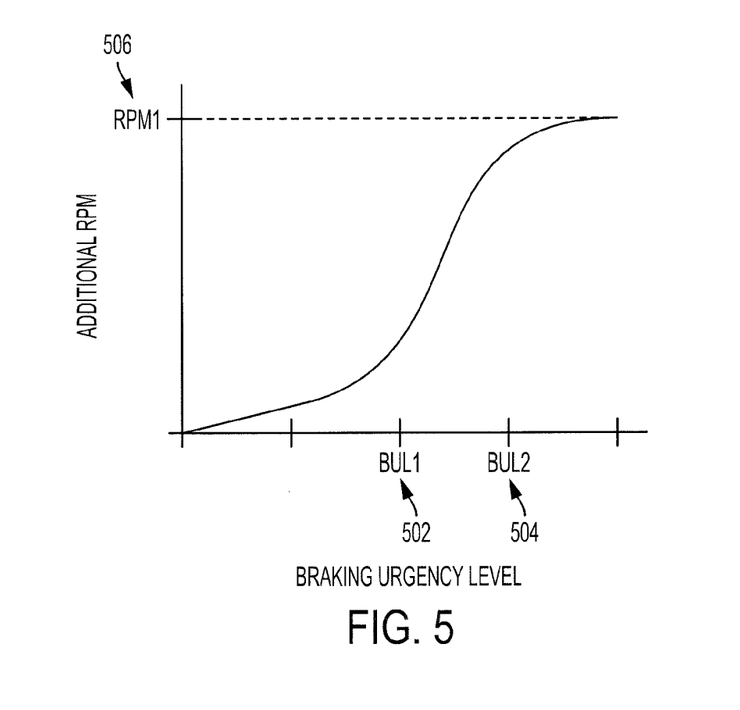
FIG. 5 is a graph depicting braking urgency level versus additional revolutions per minute (RPM) of the engine, according to an embodiment of the invention.

FIG. 5 shows a graph of additional RPM generated by the engine 120 versus braking urgency level. As described herein, the processor 122 determines a braking urgency level.

As the braking urgency level increases, the additional RPM generated by the engine 120 also increases. The engine 120 increases RPM in order to generate an engine braking effect, as described herein, to assist with braking. Once the braking urgency level reaches a first value BUL1 (502), the additional RPM generated by the engine 120 begins to increase at a higher rate. The additional RPM generated by the engine 120 increases along with the braking urgency level until a second value of braking urgency level BUL2 (504) is reached. In some embodiments, the second value of braking urgency level BUL2 (504) corresponds to an emergency braking situation, as described herein.

When the braking urgency level reaches the second value BUL2 (504), the additional RPM generated by the engine 120 is at a maximum value RPM1 (506). At this point, the engine 120 is at a maximum RPM, no fuel is being combusted, and the engine braking effect of the engine 120 is at a maximum value. Similar to the braking urgency level of FIG. 4, the braking urgency level of FIG. 5 may be on a scale of 0 to 100, and in an example embodiment, RPM1 is 3,000 RPM, BUL1 is 50, and BUL2 is 75.

In some embodiments, the gradual increase in maximum charge limit (as shown in FIG. 4) and the gradual increase in additional RPM (as shown in FIG. 5) based on braking urgency level is combined, when providing supplemental braking power to a vehicle, even if the vehicle is not in an emergency braking situation.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing deceleration in a hybrid vehicle having an engine, a motor, a hydraulic braking system, and a regenerative braking system, the system comprising:
   a hydraulic braking sensor configured to determine a status of the hydraulic braking system;
   a brake pedal unit configured to determine brake pedal data;
   a battery configured to store energy generated by the regenerative braking system up to a maximum charge limit; and
   a processor connected to the hydraulic braking sensor, the brake pedal unit, the motor, and the engine, the processor configured to:
      determine whether the hydraulic braking system is compromised based on the status of the hydraulic braking system,
      detect an emergency braking situation based on the brake pedal data, and
      when the hydraulic braking system is compromised and the emergency braking situation is detected, increase engine speed of the engine using the motor, to induce engine braking, and increase the maximum charge limit of the battery to increase a regenerative braking capacity of the regenerative braking system.

2. The system of claim 1, wherein the increased maximum charge limit of the battery is a maximum capacity of the battery.

3. The system of claim 1, wherein the maximum charge limit of the battery is increased temporarily.

4. The system of claim 3, wherein the maximum charge limit of the battery returns to a previous maximum charge limit of the battery when the hybrid vehicle is at a complete stop.

5. The system of claim 3, wherein the maximum charge limit of the battery returns to a previous maximum charge limit after passing of a predetermined amount of time.

6. The system of claim 1, wherein the brake pedal unit comprises a brake pedal stroke sensor configured to determine brake pedal stroke data and wherein the brake pedal data includes the brake pedal stroke data.

7. The system of claim 1, wherein the brake pedal unit comprises a brake pedal rate sensor configured to determine brake pedal rate data and wherein the brake pedal data includes the brake pedal rate data.

8. The system of claim 1, wherein the battery is configured to receive energy from the regenerative braking system at a charge rate up to a charge accepting rate limit, and wherein the processor is further configured to increase the charge accepting rate limit of the battery when the hydraulic braking system is compromised and an emergency braking situation is detected.

9. A hybrid vehicle having an engine, a motor, a hydraulic braking system, and a regenerative braking system, the hybrid vehicle comprising:
   a brake pedal unit configured to determine brake pedal data;
   a battery configured to store energy generated by the regenerative braking system up to a maximum charge limit of the battery; and
   a processor connected to the brake pedal unit, the motor, and the engine, the processor configured to:
      determine a braking urgency level based on the brake pedal data,
      increase engine speed of the engine using the motor, based on the braking urgency level to induce engine braking, and
      when the braking urgency level exceeds a threshold value, increase the maximum charge limit of the battery based on the braking urgency level to increase a regenerative braking capacity of the regenerative braking system.

10. The hybrid vehicle of claim 9, wherein the brake pedal unit comprises a brake pedal stroke sensor configured to determine brake pedal stroke data and wherein the brake pedal data includes the brake pedal stroke data.

11. The hybrid vehicle of claim 9, wherein the brake pedal unit comprises a brake pedal rate sensor configured to determine brake pedal rate data and wherein the brake pedal data includes the brake pedal rate data.

12. The hybrid vehicle of claim 9, further comprising a hydraulic braking sensor configured to determine a status of the hydraulic braking system, and
wherein the processor is further configured to:
determine whether the hydraulic braking system is compromised based on the status of the hydraulic braking system, and
automatically increase engine speed of the engine and increase the maximum charge limit of the battery when the hydraulic braking system is compromised.

13. The hybrid vehicle of claim 9, wherein the processor is further configured to determine a braking frequency based on the brake pedal data, and when the braking frequency exceeds a braking frequency threshold, increase the engine speed of the engine to induce engine braking and increase the maximum charge limit of the battery to increase the regenerative braking capacity of the regenerative braking system.

14. The hybrid vehicle of claim 13, wherein the processor is further configured to continuously determine the braking frequency, and when the braking frequency is below the braking frequency threshold, return the engine speed of the engine and the maximum charge limit of the battery to previous respective values.

15. A method for providing deceleration in a hybrid vehicle having an engine, a motor, a hydraulic braking system, and a regenerative braking system, the method comprising:

determining, by a hydraulic braking sensor, a status of the hydraulic braking system;
determining, by a brake pedal unit, brake pedal data;
determining, by a processor, whether the hydraulic braking system is compromised based on the status of the hydraulic braking system;
detecting, by the processor, an emergency braking situation based on the brake pedal data; and
when the hydraulic braking system is compromised and the emergency braking situation is detected, increasing, by the processor and the motor, engine speed of the engine to induce engine braking, and increasing, by the processor, a maximum charge limit of the battery to increase a regenerative braking capacity of the regenerative braking system.

16. The method of claim 15, wherein the increased maximum charge limit of the battery is a maximum capacity of the battery.

17. The method of claim 15, wherein the maximum charge limit of the battery is increased temporarily.

18. The method of claim 17, wherein the maximum charge limit of the battery returns to a previous maximum charge limit of the battery when the hybrid vehicle is at a complete stop.

19. The method of claim 17, wherein the maximum charge limit of the battery returns to a previous maximum charge limit after passing of a predetermined amount of time.

* * * * *